Aug. 22, 1950     F. W. MERRILL     2,519,918
CURRENT COLLECTOR MEMBER
Filed May 20, 1949
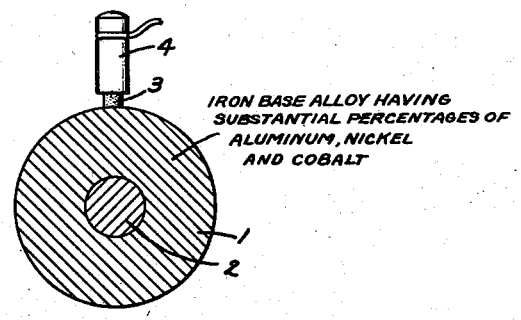
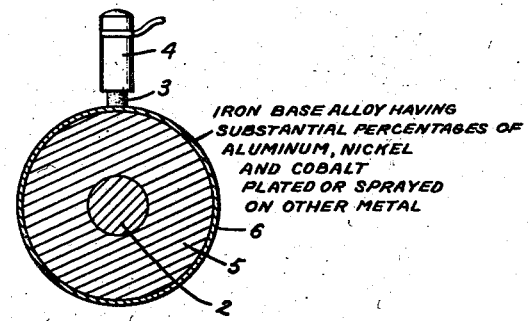
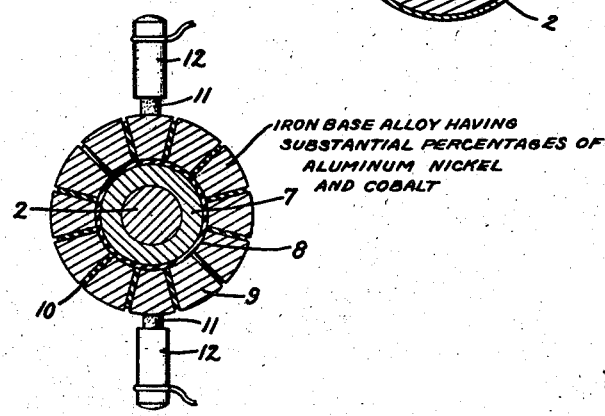
Inventor:
Frank W. Merrill,
by
His Attorney.

Patented Aug. 22, 1950

2,519,918

UNITED STATES PATENT OFFICE 2,519,918

CURRENT COLLECTOR MEMBER

Frank W. Merrill, Fort Wayne, Ind., assignor to General Electric Company, a corporation of New York Application May 20, 1949, Serial No. 94,284

9 Claims. (Cl. 171—320)

This invention relates to current collector members such as slip rings and commutators.

In the manufacture of current collector members such as slip rings and commutators for dynamoelectric machines and the like, it is desirable to form the contact surface of the member of material which will not become grooved under the brush track and which will provide the maximum brush life.

An object of this invention is to provide an improved current collector member.

Another object of this invention is to provide an improved current collector member characterized by its resistance to grooving and its ability to provide long brush life.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with this invention, there is provided a current collector member wherein the contact surface is formed of an iron base alloy containing substantial percentages of aluminum, nickel and cobalt.

In the drawing, Fig. 1 is a cross-sectional view of a slip ring formed in accordance with this invention; Fig. 2 is a cross-sectional view of another embodiment of a slip ring formed in accordance with this invention; and Fig. 3 is a cross-sectional view of a commutator formed in accordance with this invention.

Referring now to Fig. 1, there is shown a slip ring having a contact surface portion 1 suitably mounted on a rotatable shaft 2. A current collector contact member or brush 3, formed of any suitable material such as carbon brush material, is supported by a brush holder member 4 and slidingly engages the contact surface 1. The contact surface portion 1 is formed of an iron base alloy containing substantial percentages of aluminum, nickel and cobalt. A preferred alloy for this purpose is one containing 6 to 13% aluminum, 11 to 22% nickel, and 5 to 30% cobalt, the balance being iron. This alloy may also include small percentages of either copper or titanium, or both, specifically, up to 6% copper and up to 6% titanium. Referring now to Fig. 2, there is shown a slip ring having an inner portion 5 formed of conductive material such as brass suitably secured to the rotatable shaft 2. A relatively thin layer 6 of the iron base alloy described above is formed on the outer surface of the inner portion 5 in any suitable manner as by plating or spraying. A brush 3 mounted in a brush holder 4 slidingly contacts the thin layer 6 which forms the contact surface. Referring to Fig. 3, there is shown a commutator having an inner portion 7 mounted on the rotatable shaft 2. The inner portion 7 is surrounded by an insulating sleeve member 8 and a plurality of commutator bars or segments 9 are positioned around the outer surface of the insulating sleeve member and separated by insulating separators 10. The commutator bars 9 are formed of the iron base alloy described above. Brushes 11 mounted in brush holders 12 slidingly contact the outer surfaces of the commutator segments 9.

It has been found that current collector members formed of the material described above not only did not become grooved under the brush track, but that the length of brush life was six to eight times greater than with an identical brass collector. A slip ring constructed in accordance with Fig. 1 having a diameter of 1½ inches was tested from speeds ranging from 2350 to 7000 R. P. M. and $\tfrac{3}{32}$ inch square carbon brushes were used riding in the same brush track with about 8 pounds per square inch pressure. After 12,000 hours of operation, the brush wear was found to be approximately .002 inch giving an indicated brush life of 60,000 to 100,000 hours. The brush path of the current collector surface was highly polished with no indication of grooving. The current density for this test was approximately 3 amperes per square inch. Other tests have been made with current density as high as 120 amperes per square inch and brush pressure as high as 20 pounds per square inch. No grooving of the contact surface was found in any of these tests and the brush wear was on the order of that indicated above.

It will now be readily apparent that this invention provides an improved current collector contact member wherein grooving of the contact surface is eliminated and exceptionally long brush life is secured.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. A current collector member formed of an iron base alloy having 6 to 13 percent aluminum, 11 to 22 percent nickel and 5 to 30 percent cobalt.

2. A current collector member having its contact surface formed of an iron base alloy including 6 to 13% aluminum, 11 to 22% nickel, and 5 to 30% cobalt, the balance being iron.

3. A current collector member having its contact surface formed of an iron base alloy including 6 to 13% aluminum, 11 to 22% nickel, 5 to 30% cobalt, and up to 6% copper, the balance being iron.

4. A current collector member having its contact surface formed of an iron base alloy including 6 to 13% aluminum, 11 to 22% nickel, 5 to 30% cobalt, and up to 6% titanium, the balance being iron.

5. A current collector member having its contact surface formed of an iron base alloy including 6 to 13% aluminum, 11 to 22% nickel, 5 to 30% cobalt, up to 6% copper and up to 6% titanium, the balance being iron.

6. A current collector contact member having an inner portion formed of conductive material, and a contact surface formed of a thin layer of an iron base alloy having 6 to 13 percent aluminum, 11 to 22 percent nickel and 5 to 30 percent cobalt formed on the outer surface of said inner portion.

7. A commutator having bars formed of an iron base alloy having 6 to 13 percent aluminum, 11 to 22 percent nickel and 5 to 30 percent cobalt.

8. A commutator including bars having contact surfaces formed of an iron base alloy having 6 to 13 percent aluminum, 11 to 22 percent nickel and 5 to 30 percent cobalt.

9. A slip ring having its contact surface formed of an iron base alloy having 6 to 13 percent aluminum, 11 to 22 percent nickel and 5 to 30 percent cobalt.

FRANK W. MERRILL.

REFERENCES CITED

The following references are of record in the file of this patent:

UNITED STATES PATENTS

| Number | Name | Date |
| --- | --- | --- |
| 832,742 | Noeggerath | Oct. 9, 1906 |
| 1,922,028 | Chandeysson | Aug. 15, 1933 |